United States Patent [19]

Hatano et al.

[11] Patent Number: 5,527,616
[45] Date of Patent: Jun. 18, 1996

[54] LAMINATE FOR FLEXIBLE PACKAGING AND A PROCESS FOR PREPARING THE SAME

[75] Inventors: Yasushi Hatano; Kazuo Taira, both of Yokohama; Makoto Yoshida, Tokyo; Hideo Tosaki, Noda, all of Japan

[73] Assignee: Toyo Seikan Kaisha Ltd., Tokyo, Japan

[21] Appl. No.: 194,227

[22] Filed: Feb. 9, 1994

[30] Foreign Application Priority Data

Feb. 9, 1993 [JP] Japan .................................. 5-021110

[51] Int. Cl.$^6$ .............................. B32B 27/22; B32B 27/40
[52] U.S. Cl. .................................. 428/423.1; 428/423.5; 428/423.7; 428/424.2; 428/424.4; 428/424.6; 428/424.8; 428/425.8; 524/153; 524/292; 524/296; 524/298; 524/313; 528/59; 528/79; 528/80; 528/83; 528/369
[58] Field of Search ............................ 428/423.1, 423.5, 428/423.7, 424.2, 424.4, 424.6, 424.8, 425.8; 524/153, 292, 296, 298, 313; 528/369, 59, 79, 80, 83

[56] References Cited

U.S. PATENT DOCUMENTS 3,170,833  2/1965  Noyes ............................... 428/425.8 X
4,242,488  12/1980  Stanley et al. ....................... 428/423.1

*Primary Examiner*—D. S. Nakarani
*Attorney, Agent, or Firm*—Sughrue, Mion, Zinn, Macpeak & Seas

[57] ABSTRACT

A laminate for flexible packaging and a process for preparing the same. The laminate for flexible packaging is obtained by joining a plurality of flexible blanks via layers of an adhesive agent, wherein the layers of said adhesive agent are layers of an isocyanate-terminated polyurethane type hot-melt resin that is crosslinked with the moisture, the residual amount of an organic solvent in said laminate is 10 µg/m$^2$ or smaller per a unit inner surface, the peeling strength at 25° C. is 250 g/15 mm of width or greater, and a peeling strength retentivity at 80° C. is 30% or greater of the peeling strength at 25° C.

12 Claims, 4 Drawing Sheets

CHANGE IN THE LAMINATE STRENGTH WITH THE PASSAGE OF TIME

LAMINATE FOR FLEXIBLE PACKAGING AND A PROCESS FOR PREPARING THE SAME

BACKGROUND OF THE INVENTION

1. Field of the Invention

The present invention relates to a laminate for flexible packaging and a process for preparing the same. More specifically, the invention relates to a laminate for flexible packaging using a reactive hot-melt adhesive agent and to a process for preparing the same.

2. Description of Prior Art

Foods have been packaged not only by using rigid containers made up of metals, glasses and plastic materials but also by using flexible materials. Flexible packaging has an advantage in that it is light weight and that the packaging container after used can be easily disposed of.

When used in the form of a laminate by sticking a variety of flexible blanks, the flexible packaging, despite of its thin film-like or sheet-like form, exhibits a variety of functions to a sufficient degree such as excellent gas barrier property, sealing reliability, strength and heat-sealability. In order to accomplish this object, there are used, in combination and as flexible blanks, a metal foil or a gas-barrier resin that imparts gas-barrier property against oxygen and the like, an olefin resin for imparting heat-sealability, and a biaxially oriented polyester film or a nylon film for imparting mechanical strength.

The laminate can be produced by using a variety of means such as dry lamination, sandwich lamination, extrusion coating and co-extrusion. In the case of a packaging laminate that is to be subjected to the high-temperature sterilization, good results will be obtained when a dry lamination is employed using an urethane-type or an epoxy-type adhesive agent.

Japanese Patent Publication No. 11912/1983 discloses an adhesive composition for a plastic-metal foil composite packaging material which contains a polyester glycol of a particular molecular weight, a polyesterpolyurethane polyol or a mixture thereof, a silane coupling agent and an organopolyisocyanate, and in which the equivalent ratio of an isocyanate group to active hydrogen lies within a predetermined range.

The urethane-type adhesive agent is applied in the form of an organic solvent solution onto the adhesion surfaces of the metal foil and the plastic film. During the step of adhesion, however, the solvent-type adhesive permits the organic solvent to vaporize and contaminates the working environment and the air. Moreover, the solvent partly remains in the layer of the adhesive agent and deteriorates the property for retaining flavor of the content.

A number of attempts have already been made using a solventless-type adhesive agent in order to solve the problem of environmental pollution caused by organic solvents. There have been known a variety of adhesive agents such as those of the urethane-type, epoxy-type and acryl-type. Even the former urethane-type adhesive agents can be classified into those of the polyether-type, polyester-type and the like depending upon the components that are used, i.e., classified into those of the single-component adhesives that are cured with the moisture and those of the two-component adhesives that comprise a main agent and a curing agent. All of them, however, exhibit fluidity that is necessary for being applied, and are cured by the action of a catalyst or a curing agent to finally accomplish the adhesion.

It was found that the widely known solventless-type adhesive agents give satisfactory results for many adhesion purposes but are not yet satisfactory for the purposes of flexible laminate for packaging. In producing the flexible laminate for packaging, the operation for winding the prepared laminate onto the roll is indispensable from the industrial point of view. During the winding operation, however, there arises a problem in that a cavity or a so-called tunneling at which the film substrate is not adhered develop in the direction of width of the laminate roll that is wound. Even when the tunneling does not develop during the winding, the next step is not executed right after the working of the laminate which is still uncured because of the reason that the tunneling develops during the unwinding.

The phenomenon of tunneling is caused by the cohesive-destruction of the adhesive agent due to the force that stems from a difference in the internal stress between the substrates that are adhered together. In the roll of the laminate, there inevitably develops a dimensional difference caused by an increase in the diameter between the film layer on the side of center of the roll and the film layer on the outer peripheral side of the roll, from which it will be understood that the tunneling phenomenon is not avoidable.

The conventional solventless-type adhesive agent has a problem of a very small initial adhesive strength as well as a problem of generally low coating operation efficiency. That is, since the adhesive agent has a considerably low cohesive force compared with the cohesive force of the film that is adhered, the adhesive agent must be applied maintaining a thickness as small as possible within a range in which it can be uniformly applied. Compared with the solvent-type adhesive agent, however, the solventless-type adhesive agent makes it very difficult to being uniformly applied maintaining a reduced thickness.

SUMMARY OF THE INVENTION

The present inventors have discovered that when an isocyanate-terminated polyurethane which is in a solid or semi-solid form at normal temperature is selectively used as a hot-melt adhesive agent, there is obtained an initial adhesive strength which is excellent to such a degree as to prevent the occurrence of tunneling even when the laminate is wound or unwound, and that the adhesive agent is sufficiently cured with the moisture in the air or substrates, making finally it possible to obtain interlayer adhesiveness which sufficiently withstands even the retort sterilization.

The present inventors have further discovered that when the isocyanate-terminated polyurethane type hot-melt adhesive agent which is in a solid or semi-solid form at normal temperature is blended with a plasticizer of a predetermined amount, the adhesive agent can be efficiently applied onto the substrate such as a film uniformly and maintaining a reduced thickness without losing the initial adhesive strength and the final adhesive strength.

It is therefore an object of the present invention to provide a laminate for flexible packaging which does not permit the solvent to remain in the packaging container, exhibits excellent property for retaining flavor of the content and further exhibits excellent peeling strength not only at room temperature but also at high temperatures, and a process for preparing the same.

Another object of the present invention is to provide a laminate for flexible packaging which exhibits excellent initial adhesive strength, can be laminate-worked continuously, and enables the working necessary for the flexible packaging such as slit working, pouch-making working, etc. to be carried out immediately after the lamination.

According to the present invention, there is provided a process for preparing a laminate for flexible packaging comprising adhering a plurality of flexible blanks for forming a laminate by using an isocyanate-terminated polyurethane type hot-melt adhesive agent which is in a solid or semi-solid form at normal temperature as an adhesive agent, and crosslinking said adhesive agent with the moisture.

According to the present invention, there is provided a laminate for flexible packaging obtained by joining a plurality of flexible blanks via layers of an adhesive agent, wherein the layers of said adhesive agent are layers of an isocyanate-terminated polyurethane type hot-melt resin that is crosslinked with the moisture, the residual amount of an organic solvent in said laminate is 10 μg/m² or smaller per a unit inner surface area, the peeling strength at 25° C. is 25 g/15 mm of width or greater, and a peeling strength retentivity at 80° C. is 30% or greater of the peeling strength at 25° C.

It is desired that the isocyanate-terminated polyurethane used in the present invention has a number average molecular weight of from 1000 to 10000 and a viscosity of from 500 to 40000 cps as measured at 120° C. using a BH-type viscometer. It is further desired that the isocyanate-terminated polyurethane has a softening point of 30° C. or higher as measured by the ring and ball testing method. More preferably, the isocyanate-terminated polyurethane should contain a polyester polyol component having a number average molecular weight of 300 to 8000 and should contain free isocyanate groups in an amount of from 0.84 to 8.4% by weight, and should further be the one derived from the polyester polyol component which contains 3 to 50 mol % of an aromatic component selected from the group consisting of aromatic diol and aromatic dicarboxylic acid.

The hot-melt adhesive agent can be used in a single kind but may employ in combination therewith a plasticizer in an amount of 1 to 70 parts by weight per 100 parts by weight of said polyurethane, enabling the laminate to exhibit increased peeling strength and pinhole resistance after dropping at low temperatures and further enabling the adhesive agent to be applied more efficiently. It is desired that the plasticizer is in a solid or semi-solid form at normal temperature. Particularly preferably, the plasticizer should be of the ester type.

In order to improve adhesiveness to the metal foil, furthermore, there can be further contained a silane coupling agent in an amount of up to 10 parts by weight per 100 parts by weight of the polyurethane.

DETAILED DESCRIPTION OF THE PREFERRED EMBODIMENT

Figure 1:
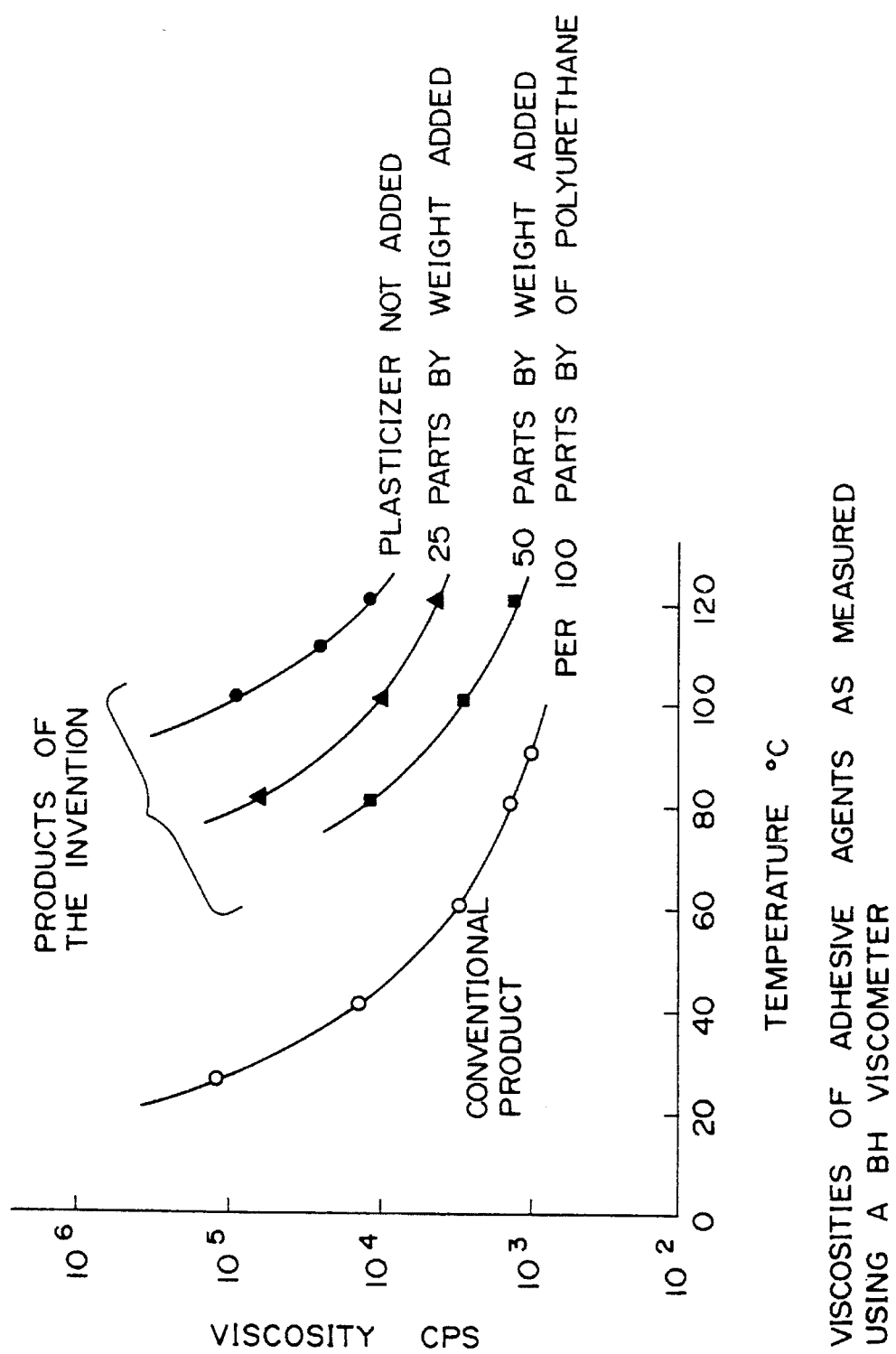
FIG. 1 is a graph plotting relationships between the temperature and the viscosity (cps) measured by using a BH-type viscometer of a conventional solventless single-component urethane adhesive agent (○), an adhesive agent of the isocyanate-terminated polyurethane used in the present invention but without blended with a plasticizer (●), an adhesive agent blended with the plasticizer in an amount of 25 parts by weight (▲) and an adhesive agent blended with the plasticizer in an amount of 50 parts by weight (■).
Figure 2:
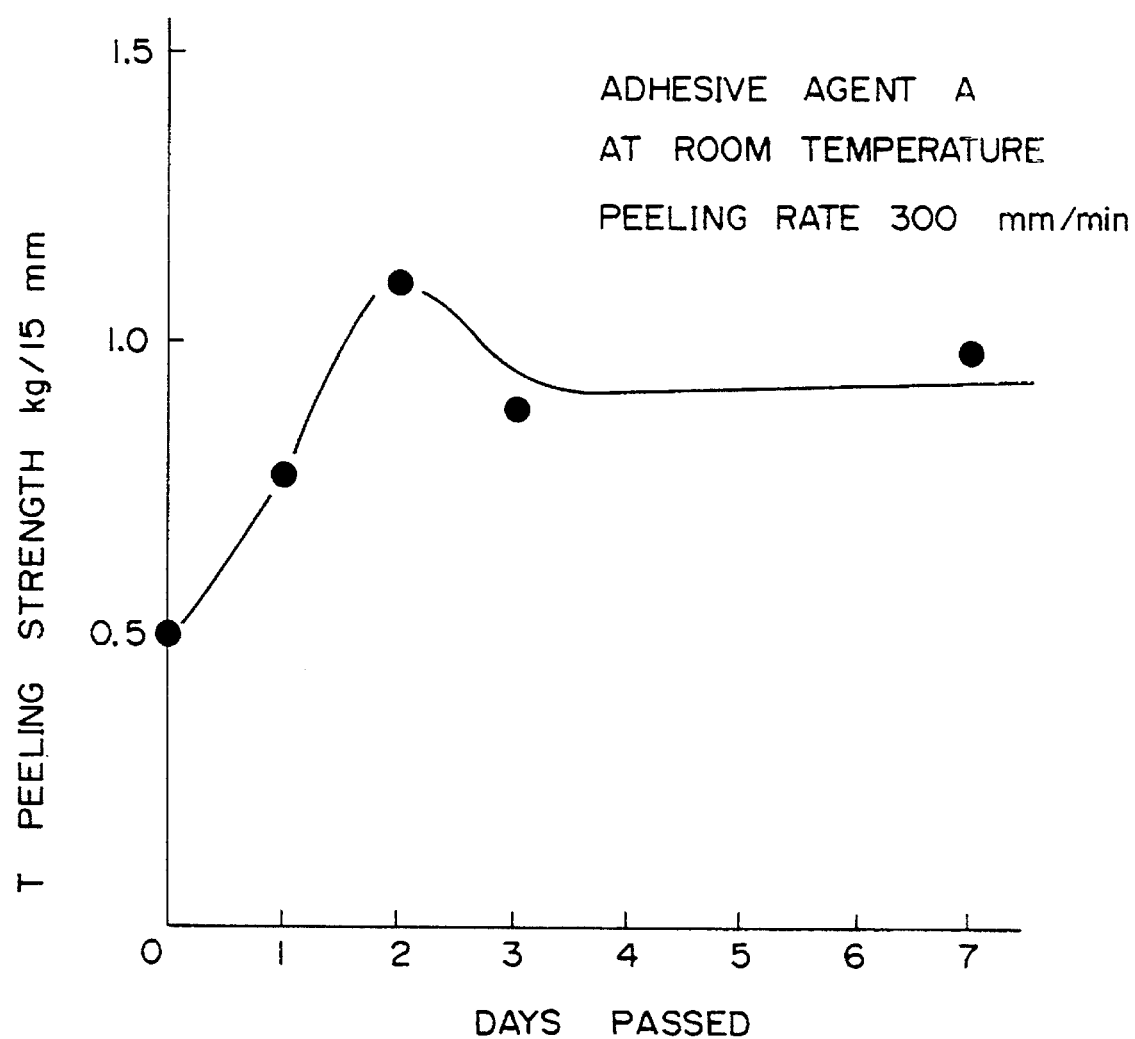
FIG. 2 is a graph illustrating a relationship between the passage of time and the peeling strength of the adhesive agent of an embodiment at room temperature.

In this specification, the hot-melt adhesive agent stands for the one that is applied and adhered in a molten state among the materials that are to be adhered together and exhibits a predetermined adhesive strength as it is cooled and solidified. Among such hot-melt adhesives, the reactive hot-melt adhesive agent stands for the one that exhibits a predetermined final adhesive strength through the reaction of the adhesive agent. The word solid material is used in an ordinary sense and the word semi-solid material is used to stand for the one which has fluidity to some extent unlike that of the solid material but which is very viscous and of which the viscosity cannot be measured by an ordinary apparatus such as the BH-type viscometer for example at normal temperature.

According to the present invention, it was found that the isocyanate-terminated polyurethane which is in a solid or semi-solid form at normal temperature can be applied as a hot-melt adhesive agent onto a flexible substrate such as a film or the like enabling the initial adhesive strength of the laminate that is formed to be enhanced to such a range that is capable of preventing the tunneling during the winding and enabling the final adhesive strength to be enhanced to be capable of withstanding the retort sterilization.

Reference should be made to Tables 2 and 3 of Examples appearing later. When a known solventless single-component urethane adhesive agent (E) and a known solventless two-component urethane adhesive agent (G) are used, the tunneling develops when the laminate is unwound. The adhesive agent developing the tunneling exhibits an initial adhesive strength (peeling rate of 300 mm/min) of, for example, 30 g/15 mm of width which is considerably smaller than 100 g/15 mm of width as shown in Table 3. It will be understood from this fact that the tunneling stems from the destruction of adhesion, i.e., stems from an cohesive force of the urethane-type adhesive agent of before being cured which is so small as not being capable of withstanding the difference in the internal distortion among the laminated substrates.

Furthermore, the conventional solventless urethane type adhesive agent after cured (with the moisture) exhibits the adhesive strength which is improved to such a level as 400 g/15 mm of width but permits the adhesive strength to be dropped to almost zero after the retort sterilization.

On the other hand, when the isocyanate-terminatedpolyurethanes (A, B, C, D) which are in a solid or semi-solid form at normal temperature are used as hot-melt adhesive agents, development of the tunneling is completely prevented when the laminate is wound, and the uncured adhesive agent exhibits the initial adhesive strength (peeling rate of 300 mm/min) of 200 g/15 mm of width and, particularly, 400 g/15 mm of width as shown in Table 3.

Besides, the urethane-type adhesive agent exhibits the adhesive strength after cured (with moisture) which is increased to a level of 700 g/15 mm of width and does not almost permit the adhesive strength to decrease even after subjected to the retort sterilization.

The isocyanate groups at the terminals impart reactivity to the hot-melt adhesive agent that is used in the present invention, i.e., impart functionality that is a basis of property of being cured with the moisture and the initial adhesive strength. This, however, is not sufficient for preventing the tunneling. By selecting the isocyanate-terminated polyurethane which is in a solid or semi-solid form at normal temperature, it is made possible to increase the cohesive force and to maintain the initial adhesive strength at the above-mentioned level.

According to the present invention, the laminate is prepared by using the hot-melt adhesive agent but without at all using such a diluent as an organic solvent. Therefore, though the organic solvent should not be detected in principle, the residual amount of the organic solvent in the laminate that stems from a printing ink or a migration from the external side is usually 10 μg/m² or smaller and, particularly, 2 μg/m² or smaller per a unit surface area. Therefore, the flavor of the content is not at all deteriorated by the residual solvent.

When the conventional solvent-type polyurethane adhesive agent is used as shown in the examples of measuring the residual solvent appearing later, organic solvents such as toluene, methyl ethyl ketone, ethyl acetate and the like necessarily remain in the laminate that is formed, the residual amount thereof reaching the order of 30 μg/m² per a unit area causing the flavor to be deteriorated. According to the present invention, however, this defect can be effectively eliminated.

According to the present invention which uses a hot melt of an isocyanate-terminated polyurethane as an adhesive agent, the peeling strength at room temperature is maintained at a level as high as 250 g/15 mm of width and, besides, the peeling strength even at such a high temperature as 80° C. is maintained at 30% or more and, particularly, 40% or more of e peeling strength at room temperature.

The conventional solventless type polyurethane adhesive agent exhibits an excellent peeling strength at room temperature (25° C.) but permits peeling to easily take place on the adhesion interface when the temperature becomes as high as 80° C. or more. The peeling strength retentivity at this temperature is as low as about 20% at the greatest. This is due to the fact that with the conventional solventless type polyurethane, the cross linking density is so high that the stress is not internally absorbed and unrelaxed and the stress is concentrated on the interface of adhesion.

The layer of adhesive agent in the laminate of the present invention has such a dynamic viscoelastic property that a temperature p at the peak value of tan δ is 55° C. or lower and, particularly, 45° C. or lower, wherein tan δ is defined by the equation, $$\tan \delta = \frac{E''}{E'} \quad (1)$$

where E' is a storage modulus of elasticity in the measurement of dynamic viscosity, and E'' is a loss modulus of elasticity,
and that a high-temperature relaxation property defined by the equation, $$R = \frac{(\tan \delta)_{120}}{(\tan \delta)_p} \times 100 \quad (2)$$

where $(\tan \delta)_p$ is a peak value of tan δ at said temperature p, and $(\tan \delta)_{120}$ is a value of tan δ at 120° C., is 8% or greater and, particularly, 10% or greater.

Figure 3:
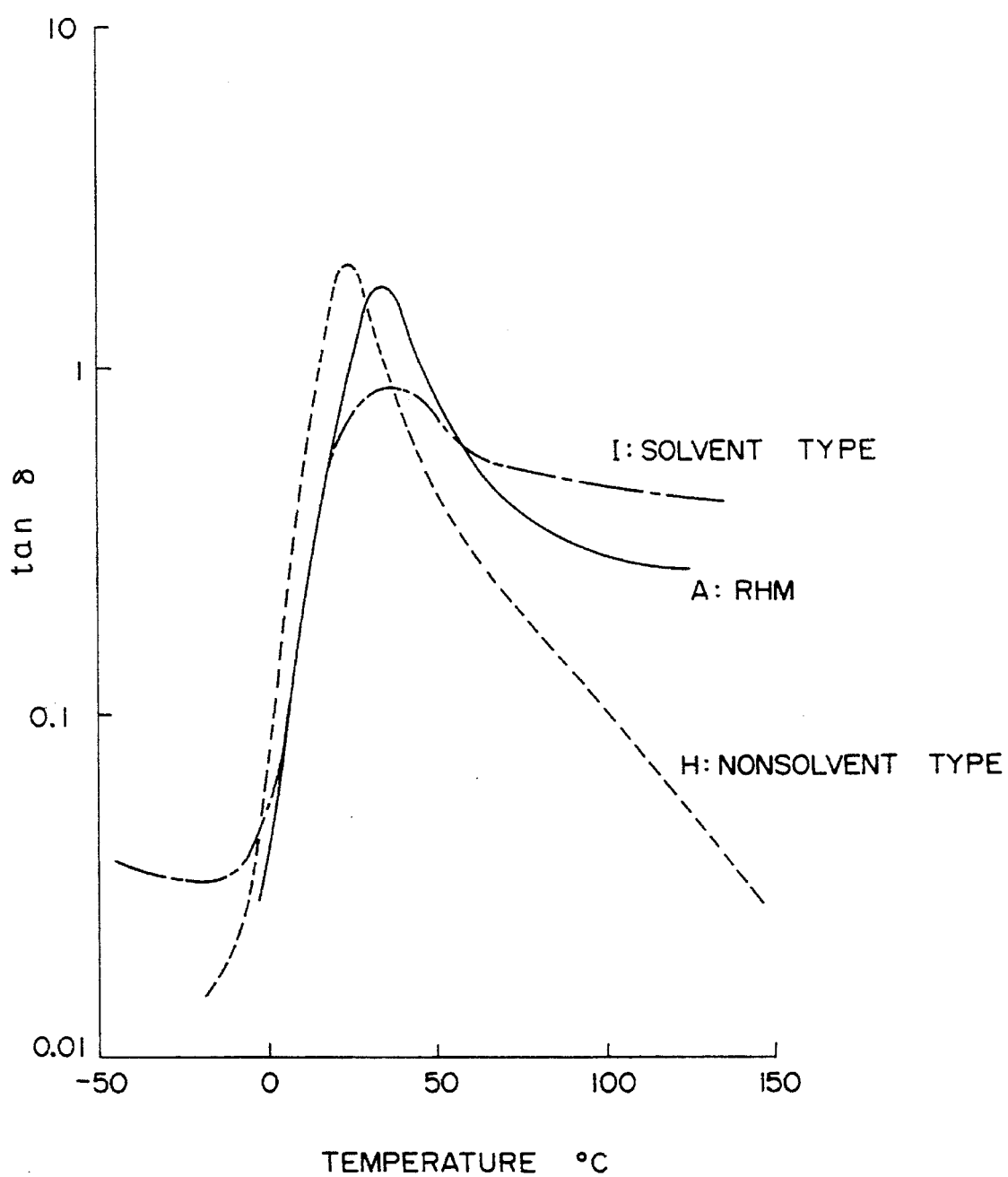
FIG. 3 is a graph plotting relationships between the temperature and tan δ in the measurement of dynamic viscosities of a cured product (A) of the isocyanate-terminated polyurethane used in the present invention, a cured product (I) of a conventional solution-type polyurethane adhesive agent, and a cured product (H) of a conventional solventless two-component polyurethane adhesive agent.

That is, with the conventional solventless type polyurethane adhesive agent as shown in FIG. 3, the stress is little relaxed at high temperatures and becomes a cause of adhesion destruction. With the laminate of the present invention, on the other hand, the stress is effectively relaxed at high temperatures and, hence, a high peeling strength is maintained at high temperatures.

Figure 4:
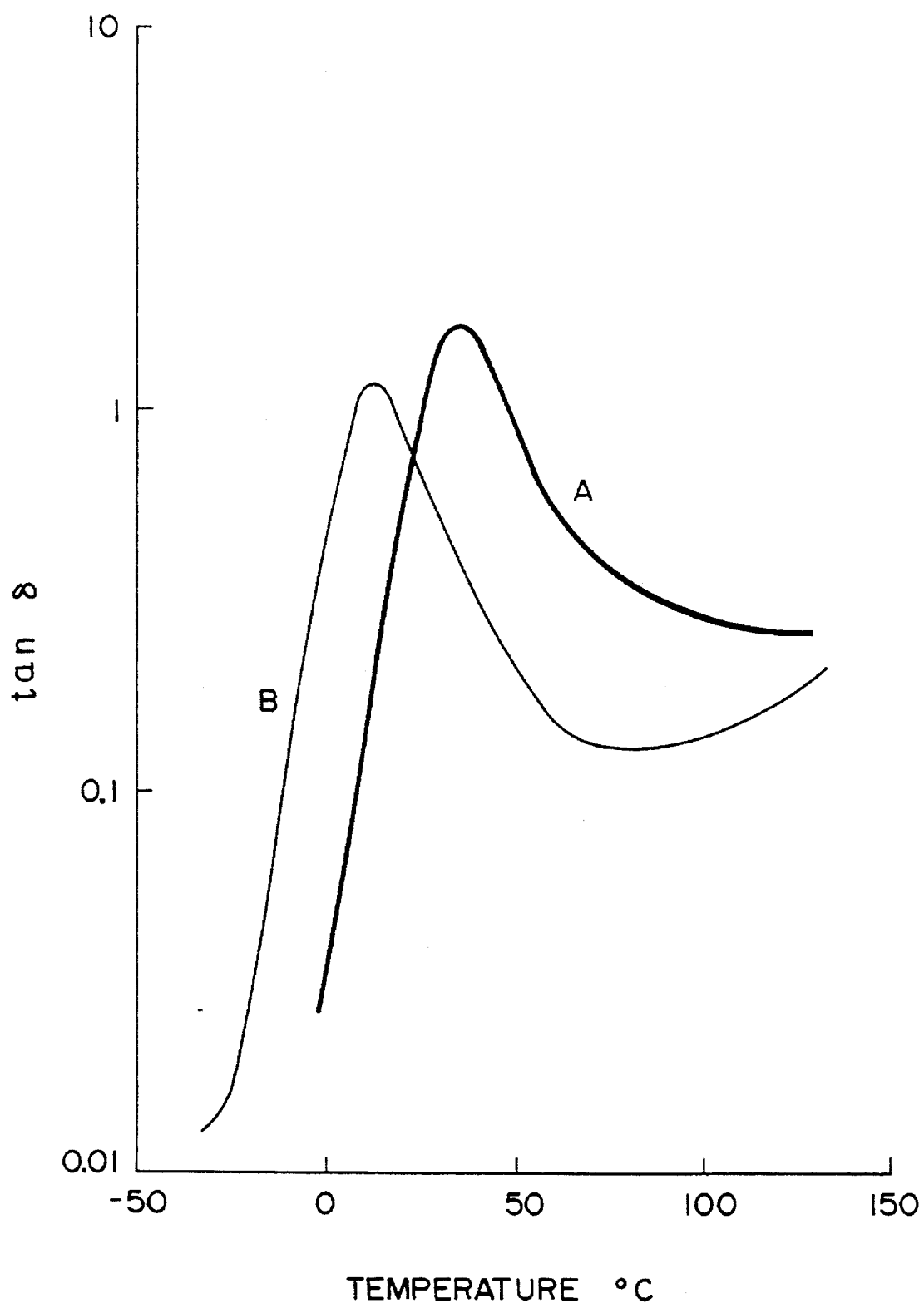
FIG. 4 is a graph plotting relationships between the temperature and tan δ in the similar measurement of the above cured product (A) and a cured product (B) of the adhesive agent obtained by blending the polyurethane with a plasticizer.

From the standpoint of increasing the peeling strength at low temperatures, the peak temperature of tan δ should lie within the aforementioned range. Reference should be made to FIG. 4. With the plasticizer being contained in the polyurethane adhesive agent, the peak temperature of tan δ can be shifted toward the low temperature side, whereby low-temperature brittleness in the adhesive agent layer is improved, and pinholes and delamination are prevented from developing at the pouch dropping test.

The isocyanate-terminated polyurethane used in the present invention has an advantage in that it can be melted by heating like an ordinary hot-melt adhesive agent and can be applied as a layer of adhesive agent onto the substrate for laminate such as a film or the like though it assumes a solid or semi-solid form at normal temperature. The isocyanate-terminated polyurethane blended with the plasticizer in an amount of 1 to 70 parts by weight per 100 parts by weight of the resin can be efficiently applied onto the substrate such as the film uniformly and maintaining a reduced thickness without decreasing the initial adhesive strength and the final adhesive strength but rather improving brittleness at low temperatures.

FIG. 1 is a graph plotting relationships between the temperature and the viscosity (cps) measured by using a BH-type viscometer of a conventional solventless one-can type urethane adhesive agent (○), an adhesive agent of the isocyanate-terminated polyurethane used in the present invention but without blended with a plasticizer (●) an adhesive agent blended with the plasticizer in an amount of 25 parts by weight (▲) and an adhesive agent blended with the plasticizer in an amount of 50 parts by weight (■). It will be understood from this graph that the plasticizer that is blended makes it possible to lower the viscosity at each of the temperatures and to improve the applicability. A decrease in the viscosity makes it possible to carry out the application operation at high speeds, to apply the film which is as thin as about one to several microns, to form a layer of the adhesive agent maintaining a uniform thickness, and to prevent the occurrence of mist during the coating.

According to the present invention, even when the isocyanate-terminated polyurethane is blended with the plasticizer, the adhesive agent loses the initial adhesive strength little and the final adhesive strength is little affected as will be understood from the fact that there does not exist a great difference in the adhesive strength between the adhesive agent (A) not blended with the plasticizer and the adhesive agent (B) blended with the plasticizer shown in Table 2 appearing later.

When there is used an isocyanate-terminated polyurethane having a number average molecular weight of 1000 to 10000, a viscosity of 500 to 40000 cps at 120° C. as measured by the BH-type viscometer, and a softening point of 30° C. or higher as measured by the ring and ball testing method, a good balance can be maintained between the initial adhesive strength of the adhesive agent and the coating operation. When the number average molecular weight is smaller than the above range, the cohesive force tends to decrease during the initial state of adhesion and when the number average molecular weight is greater than the above range, on the other hand, the application workability is deteriorated, or the adhesive resin is not uniformly applied maintaining a reduced thickness.

Furthermore, when there is used an isocyanate-terminated polyurethane containing a polyester polyol component having a number average molecular weight of 300 to 800 and free isocyanate groups in an amount of 0.84 to 8.4% by weight, there is obtained a reactive hot-melt adhesive agent which exhibits a suitable viscosity when it is being applied and a suitable curing property. When the content of the free isocyanate groups is smaller than the above range, the viscosity of the adhesive agent becomes too high or the degree of curing is not sufficient. When the content of the free isocyanate groups is greater than the above range, on the other hand, the curing tends to become sluggish or foams evolve due to carbonic acid gas.

Moreover, when there is used an isocyanate-terminated polyurethane which is derived from a polyester polyol component that contains an aromatic component selected from the group consisting of aromatic diol and aromatic dicarboxylic acid in an amount of 3 to 50 mol %, the cohesive force during the initial adhesion can be increased without the need of much increasing the molecular weight of the polyurethane.

When there is used a plasticizer which is in a solid or semi-solid form at normal temperature, the drop of the initial adhesive strength can be suppressed and, besides, the laminate is prevented from being adversely affected by the bleeding. Furthermore, a plasticizer of the ester type exhibits intimacy to the polyester urethane and helps obtain a greatly decreased viscosity at the time of application.

According to the present invention as described above, there is provided a laminate for flexible packaging which contains the organic solvent in very small amounts and exhibits markedly enhanced property for retaining flavor of the content as well as excellent peeling strength not only during the initial period but also under high-temperature conditions. Moreover, the adhesive agent which contains the plasticizer exhibits improved brittleness at low temperatures, and can be applied favorably and uniformly.

According to the present invention, the lamination working is continuously carried out, and distinguished advantages are obtained in preparing the laminate for flexible packaging such as carrying out, immediately after the lamination, the working essential for the flexible packaging like slitting the laminate and making pouches.

Isocyanate-Terminated Polyurethane

The adhesive agent according to the present invention chiefly comprises a polyurethane prepolymer obtained by the reaction of a polyol and a polyisocyanate compound. If mentioned in further detail, the adhesive agent comprises a polyurethane prepolymer obtained by blending one or two or more of polyols having two or more, or preferably two to three active hydrogen atoms in one molecule, such as a polyether polyol, polyester polyol and a polyacrylic polyol, and one or two or more of polyisocyanate compounds at an NCO/OH ratio over a range of from 1.2 to 4 or, more preferably, over a range of from 1.5 to 2.5 and reacting them at a temperature of 60° to 130° C. for several hours, or the adhesive agent is obtained by extending the chain of the above-mentioned SO polyurethane prepolymer using a suitable chain extender (e.g., water, low molecular weight diol, diamine or the like).

(Polyol)

According to the present invention, any polyol can be used provided the final adhesive agent is in a solid or a semi-solid form at normal temperature and, particularly, it has a softening point of higher than 30° C. The softening point of the adhesive agent is much adjusted by the chemical structure of the polyol that is used. A polyester polyol is preferred and there can be used a widely known polyester polyol that is used in the production of a polyester polyurethane.

Among them, a preferred polyester polyol comprises a diol and a dicarboxylic acid, and is obtained by suitably reacting at least one or more of aliphatic diols having relatively low molecular weights, at least one or more of aliphatic carboxylic acids having relatively low molecular weights, and one or more of aromatic carboxylic acids or aromatic diols in a manner to satisfy the requirements mentioned later. Furthermore, the polyester polyol may contain, for example, a polyester component that is obtained by subjecting a polycaprolactam to the ring-opening polymerization.

Preferred examples of the aliphatic diol component having a relatively low molecular weight include a 2-propanediol, a 1,3-propanediol, a 1,3-butanediol, a 1,4-butanediol, a 1,5-pentanediol, a 1,6-hexanediol, a 1,8-octanediol, a 1,10-decanediol, a neopentyl glycol, an ethylene glycol, a diethylene glycol, a polyethylene glycol, a dipropylene glycol, a polypropylene glycol, a 1,4-cyclohexane methanol, a 1,4-cyclohexanediol, a 3-methyl-1,5-pentanediol and the like.

Preferred examples of the aliphatic carboxylic acid having a relatively low molecular weight include malonic acid, succinic acid, glutaric acid, adipic acid, pimelic acid, suberic acid, azelaic acid, sebacic acid, decanedicarboxylic acid, dodecanedicarboxylic acid, 1,3-cyclohexanedicarboxylic acid, 1,4-cyclohexanedicarboxylic acid, and the like.

Preferred examples of the aromatic dicarboxylic acid and aromatic diol include orthophthalic acid, isophthalic acid, terephthalic acid, bisphenol A and the like.

As the adhesive agent which is in a solid or semi-solid form at normal temperature, there can be used a crystalline polyester polyol which is obtained by selecting and synthesizing suitable amounts of alkylenedicarboxylic acid having four or more methylene groups bonded thereto and an alkylene diol and having a melting point of 30° C. or higher and, particularly preferably, from 30° to 80° C., or there can be used a polyester polyol having an adjusted glass transition temperature obtained by synthesizing a suitable amount of aromatic dicarboxylic acid, an alkylene diol and/or a neopentyl glycol, a 1,4-cyclohexanemethanol or a bulky diol such as an aromatic diol.

In the case of a polyester polyol using only a bulky aliphatic diol such as a neopentyl glycol as a diol component of the polyester, a satisfactory result is obtained from the standpoint of the initial adhesive strength. However, since the polyol component is contained in a relatively large amount, the molecular weight of the prepolymer becomes greater than 10000, the thickness of the coated film becomes large, smoothly coated surface is not obtained, mist generates, and the adhesive agent is not sufficiently applied.

From the standpoint of application property, it is desired that the prepolymer has a number average molecular weight of from 1000 to 10000. The glass transition temperature of the polyester polyol can be advantageously adjusted by incorporating in the molecule a component that has an aromatic ring. That is, from the standpoint of providing an adhesive agent which offers such excellent application properties as smoothly applied surface without threading, it is desired to use a prepolymer having a number average molecular weight of from 1000 to 10000 which is derived from a polyester polyol that contains a component having an aromatic ring such as aromatic dicarboxylic acid or aromatic diol in an amount of 3 to 50 mol % and, particularly, preferably in an amount of 5 to 40 mol % and having a number average molecular weight of from 300 to 8000.

Use of the adhesive agent derived from the polyester polyol containing aromatic component gives an additional advantage such as markedly improved adhesion to the polyester film such as of a polyethylene terephthalic, a polyethylene terephthalic isophthalate, or a polybutylene terephthalic.

In the applications of retort food packagings, furthermore, hydrolysis of the polyester component in the adhesive agent is suppressed during the retort sterilization, Polyisocyanate Compound As the polyisocyanate compound, there can be used a widely known polyisocyanate compound that is used for the production of polyurethane adhesive agents. Among them, it is desired to use a diisocyanate such as a tolylene diisocyanate, a 4,4-diphenylmethane diisocyanate, a xylylene diisocyanate, a naphthylene diisocyanate, a paraphenylene diisocyanate, a tetramethylxylylene diisocyanate, a hexamethylene diisocyanate, a dicyclohexylmethane diisocyanate, an isophorone diisocyanate or a tolidine diisocyanate. When the present invention is to be applied to the food packaging containers, in particular, there can be preferably used the 4,4-diphenylmethane diisocyanate, xylylene diisocyanate, isophorone diisocyanate and hexamethylene diisocyanate. These diisocyanates are generally used in a single kind. It is, however, allowable to use one of them as a main component in combination with other polyisocyanate compounds.

Plasticizer

It is generally desired to add a plasticizer in order to impart excellent coating property to the adhesive agent and to improve the brittleness of adhesive at low temperatures. The kind and amount of the plasticizer are determined depending upon the degree for improving the coating property, effect upon the adhesion property, field of use, etc.

Widely known plasticizers are used in a single kind or in combination. However, the plasticizers which so lowers the laminate strength as to affect the required properties are not desirable. From the object of the present invention, furthermore, the plasticizer that greatly decreases the initial adhesive strength is not desired. In such a case, the amount of use must be decreased. Moreover, those plasticizers that bleed out penetrating through the film substrate are not desirable since they impair the heat sealability. In the case of packaging the foods, such plasticizers are not desired from the standpoint of sanitation and flavor.

From such viewpoints, a particularly preferred plasticizer should be in a solid or semi-solid form at ordinary temperature. Though not limited thereto only, preferred examples of the plasticizer include a diphenyl phthalate, a dicyclohexyl phthalate, a dimethylcyclohexyl phthalate, an ethylphthalyethyl glycolate, a triphenyl phosphate, a diethyleneglycol dibenzoate, a trimethoxypropane, a glycerol tribenzoate, a glycerol trilaurate, and the like. Furthermore, the plasticizer may be a copolyester of a relatively low molecular weight without functional group.

In general, the plasticizer is added in an amount of 1 to 70 parts by weight and, more preferably, in an amount of 5 to 50 parts by weight per 100 parts by weight of the polyurethane resin. When the migration of the plasticizer into the content becomes a problem, it is desired to use a film layer such as an aluminum foil that interrupts the migration of the plasticizer in a form being interposed between the film layer and the content. In this case, the presence of the plasticizer helps suppress the generation of pin-holes that stem from the bending of the relatively hard film layer such as the aluminum foil.

As required, the adhesive agent of the present invention may be blended with suitable amounts of blending agents used for the ordinary hot-melt adhesive agents, such as a thermoplastic polymer (polyurethane, polyester, polyether, ethylene-type copolymer, propylene-type copolymer, vinyl chloride-type copolymer, acrylic copolymer, various rubbers, etc.), a stickiness imparting resin (rosin resin, rosin ester resin, hydrogenated rosin ester resin, terpene resin, terpene phenol resin, hydrogenated terpene resin, petroleum resin, hydrogenated petroleum resin, cumarone resin, ketone resin, styrene resin, modified styrene resin, xylene resin, epoxy resin, etc.), and/or a filler (silicic acid derivative, talc, metal powder, calcium carbonate, clay, carbon black, etc.) for improving adhesiveness or applicability, as well as a catalyst (dibutyltin dilaurate, dibutyltin dioctate, dimethylcyclohexylamine, dimethylbenzylamine, etc.), pigment, antioxidizing agent, ultraviolet ray-absorbing agent, surfactant, and a flame-retarding agent.

In preparing the adhesive agent of the present invention, the additives are usually blended at the following ratios; i.e., 0 to 10 parts by weight of the thermoplastic polymer, 0 to 15 parts by weight of the stickiness imparting resin, 0 to 100 parts by weight of the plasticizer, 0 to 10 parts by weight of the intimacy imparting agent, 0 to 10 parts by weight of the antioxidizing agent, 0 to 3 parts by weight of thesurfactant, and suitable amounts of other blending agents per 100 parts by weight of the polyurethane prepolymer. These additives are dehydrated in advance by such a method as heated vacuum drying. The mixing is effected by a method of purging with a nitrogen gas using a mixer that can be heated at 60° to 130° C. being kept off the air.

For the applications where a high degree of adhesion is required for the metal foil or the like, a silane coupling agent should be used in combination. Examples of the silane coupling agent include compounds of the following formula (3),

wherein R is a vinyl group, an amino group, an imino group, an epoxy group or a mercapto group, X is a hydrolyzabie group such as a lower alkoxy group or a halogen atom, and Y is an alkyl group or a group X, and particularly, vinyl silanes such as a vinyl triethoxysilane, a vinyl trichlorosilane and the like, amino silanes such as an aminopropyltriethoxysilane and the like, epoxy silanes such as a γ-glycidoxypropyltriethoxysilane and the like, and isocyanate functional silanes such as a γ-isocyanatepropylethoxysilane and the like.

Though there is no particular limitation, the silane coupling agent is used as a primer, added to the adhesive agent (integrally blended) or is used for modifying the adhesive agent itself by being copolymerized or grafted.

When used as the primer, the silane coupling agent is usually diluted with water or with an organic solvent, applied to the substrate and is dried. In preparing an aqueous solution, the silane coupling agent is used at a silane concentration of 0.1 to 5% by weight and, preferably, at a silane concentration of 0.5 to 3% by weight. In the case of a silane coupling agent that dissolves less in water, water containing about 0.05% to about 3% of acetic acid is used as a solvent.

When integrally blended, the silane coupling agent is used in an amount of up to 10 parts by weight per 100 parts by weight of the isocyanate-terminated polyurethane.

Though there is no particular limitation in the method of modification by being copolymerized or grafted, the polyol which is the starting material of the adhesive agent is modified in advance with a silane coupling agent, or the polyol, polyisocyanate and silane coupling agent are reacted together to synthesize the polyurethane prepolymer, or the polyurethane prepolymer that is synthesized is reacted with the silane coupling agent. In this case, the silane coupling agent can be used in an amount of up to 10 parts by weight per 100 parts by weight of the isocyanate-terminated polyurethane.

Properties of the Adhesive Agent

The adhesive agent used in the present invention should be in a solid or semi-solid form at ordinary temperature, and should have a softening point of 30° C. and, particularly, over a range of from 30° C. to 80° C. as measured by the ring and ball testing method. The adhesive agent should have a number average molecular weight of from 1000 to 10000 and a viscosity at 120° C. of from 500 to 40000 cps as measured using the BH-type viscometer.

The following Table 1 shows comparison with the conventional solventless single-component urethane adhesive agent.

TABLE 1

| Items | Adhesive agent | |
|---|---|---|
| | Reactive hot-melt adhesive agent | Solventless single-component urethane adhesive agent |
| Appearance | semi-solid or solid | liquid |
| Number ave. mol wt. | 1000–10,000 | same as left |
| Viscosity (cps) (measuring temp.) | 500–40,000 (120° C.) | 100,000–200,000 (25° C.) |
| Softening point | 30° C. or higher | normal temp. or lower |

In the lamination working, the smooth surface after the adhesive agent is applied is important from the standpoint of not leaving foams in the interface of adhesion after press-adhered to the opposing substrate. However, small amounts of foams that generate when sufficient smoothness is not obtained extinguish due to creep deformation of the adhesive agent after laminated. From this point of view, the adhesive agent should be semi-solid at 20° to 80° C.

Amount of Free Isocyanate

In general, the free isocyanate group contained in the urethane adhesive agent is supposed to bond chemically to the oxide formed on the surface of the film due to corona processing or the layer of a hydrated oxide of a metal substrate, and which contributes to the adhesion. Furthermore, the free isocyanate group reacts with water to form a urea bond and to increase the molecular weight of the adhesive agent itself, and further reacts with the urethane bond or the urea bond to form an allophanate bond or a buret bond, i.e., form a three-dimensional crosslinking structure which contributes to increasing the heat resistance and adhesive strength. It is desired that the free isocyanate group is contained in an amount of from 0.84 to 8.4% by weight. When the amount of the free isocyanate group is smaller than 0.84% by weight, the adhesive agent that is obtained exhibits a too large viscosity and when the amount of the free isocyanate group becomes larger than 8.4% by weight, the curing becomes sluggish though it varies depending upon the state of feeding water. Or, conversely, when the curing proceeds quickly, foaming may take place to a considerable degree due to the carbonic acid gas evolved from the quick reaction.

Laminate and a Method of Preparing the Laminate

According to the present invention, the isocyanate-terminated polyurethane type hot-melt adhesive agent which is in a solid or semi-solid form at normal temperature is applied in a molten form onto the surface of a flexible blank for forming a laminate, and a plurality of flexible blanks are adhered together via this layer of adhesive agent. It is desired that the hot-melt adhesive agent is applied at a temperature of from 60° to 130° C. onto the flexible blanks that are to be laminated. The adhesive agent should be applied by using a solventless laminator, and the blank should be stuck to the opposing one by using a nip roll heated at the above-mentioned temperature. Though there is no particular limitation, the adhesive agent should generally be applied to the film substrate at a rate of 100 to 250 m/min.

The adhesive agent used in the present invention is of the type of being cured with the moisture, and the amount of water necessary for curing the adhesive agent is determined from the amount of application and the amount of free isocyanate. Water utilized for the curing include water that is forcibly added during the lamination, water contained in the substrate, water that permeates through the substrate and water that permeates from the side surface though the amount in this case may be small. In general, the laminate that is just formed is preserved being wound until it is delivered to the next step and during this period, water permeates in very small amounts through the substrate. It is desired that the adhesive agent is applied in an amount of from 0.2 to 20 g/m$^2$ and, particularly, from 0.5 to 10 g/m$^2$ from the standpoint of efficiently carrying out the curing reaction and maintaining desired adhesiveness.

As a flexible material, there are used in combination a metal foil or a gas-barrier resin that imparts gas barrier property against oxygen and the like, an olefin resin for imparting heat-sealability, and a biaxially oriented plastic film for imparting mechanical strength.

Examples of the metal foil include a variety of surface-treated steel foils and light metal foils such as of aluminum and the like. The surface-treated steel foil will be a cold-rolled steel foil which is subjected to one or two or more kinds of treatments such as plating with zinc, tin or nickel, electrolytic treatment with chromate or treatment with chromate, etc., or a surface-treated steel foil obtained by effecting the plating prior to the final rolling and then effecting the cold-rolling. The light metal foil will be an aluminum alloy foil in addition to the so-called pure aluminum foil. These metal foils should have a thickness of 150 μm or smaller and, particularly, from 5 to 120 μm.

On one surface of the metal foil may be provided a protection coating by a method other than lamination. The protection coating is formed by providing a protection paint.

Examples of the protection paint include any protection paints composed of a heat-curing resin and a thermoplastic resin such as modified epoxy paints, i.e., a phenol epoxy paint, an amino epoxy paint, etc., vinyl or modified vinyl paints such as a vinyl chloride/vinyl acetate copolymer, a partly saponified product of the vinyl chloride/vinyl acetate copolymer, a vinyl chloride/vinyl acetate/maleic anhydride copolymer, an epoxy-modified, an epoxyamino-modified or an epoxyphenol-modified vinyl paint, etc., an acrylic resin type paint, and a synthetic rubber type paint such as a styrene-butadiene type copolymer, which may be used in a single kind or in a combination of two or more kinds.

These paints are obtained in the form of an organic solvent solution such as enamel or lacquer, in the form of an aqueous dispersion or aqueous solution, and are applied to the metal blank by way of roller coating, spray coating, dip coating, electrostatic coating, electrophoretic coating, etc. The resin paint having a heat-curing property is printed as required. It is desired that the protection coating has a thickness (in dry state) of generally from 2 to 30 μm and, particularly, from 3 to 20 μm from the standpoint of corrosion resistance and workability.

Examples of the heat-sealable resin film generally include modified olefin resins such as a low-, a medium- or a high-density polyethylene, a linear low-density polyethylene, an isotactic polypropylene, a propylene/ethylene copolymer, an ethylene/vinyl acetate copolymer, an ethylene/acrylic acid copolymer, an ethylene/methyl methacrylate copolymer, an ionically crosslinked olefin copolymer (ionomer), an olefin resin graft-modified with ethylenically unsaturated carboxylic acid or an anhydride thereof, etc., a polyamide or copolyamide resin having a relatively low melting point or a low softening point, a polyester or a copolyester resin having a relatively low melting point or a low softening point, which may be used in a single kind or in a combination of two or more kinds. These films should have a thickness of from 15 to 100 μm.

Examples of the film other than the heat-sealable resin include polyester films such as a polyethylene terephthalate, a polybutylene terephthalate, an ethylene terephthalate/isophthalate copolymer, etc., polyamide films such as a nylon 6, a nylon 6,6, a nylon 11, a nylon 12, etc., a polyvinyl chloride film, a polyvinylidene chloride film, an ethylene/vinyl alcohol copolymer film, etc. These films may be casted or biaxially oriented and should have a thickness of generally from 3 to 50 μm and, particularly, from 5 to 40 μm.

In the laminate of the present invention, at least one adhesion interface among the flexible blanks that are to be laminated is laminate-worked by using an isocyanate-terminated polyurethane adhesive agent which is in a solid or semi-solid form at normal temperature. That is, in preparing the laminate having three or more layers, every lamination working may be carried out in accordance with means of the present invention. In addition to the means of the present invention, however, there may be employed in combination a widely known lamination means such as extrusion coating, sandwich lamination, powder coating lamination, coextrusion, etc. in the case of the three-layer constitution, for example, lamination between the outer layer and the intermediate layer is effected by the means of the present invention, the anchor coating is provided on the intermediate layer, and the inner layer resin is extrusion-coated, or the adhesive resin and the inner layer resin are coextrusion-coated onto the intermediate layer, or the intermediate layer and the inner layer are laminated by sandwich lamination.

The extrusion resin may be any extrusion resin. Generally, there are used modified olefin resins such as a low-, a medium- or a high-density polyethylene, a linear low-density polyethylene, an isotactic polypropylene, a propylene/ethylene copolymer, an ethylene/vinyl acetate copolymer, an ethylene/acrylic acid copolymer, an ethylene/methyl methacrylate copolymer, an ionically crosslinked olefin copolymer (ionomer), an olefin resin graft-modified with ethylenically unsaturated carboxylic acid or an anhydride thereof, a polyamide or copolyamide resin having a relatively low melting point or a low softening point, a polyester or copolyester resin having a relatively low melting point or low softening point, a blended resin consisting of one or two or more of the above-mentioned resins and/or a widely known filler, etc. which are extruded into a single layer or coextruded.

As the powder coating resin, in general, the same resin as the above-mentioned extrusion resin is used being pulverized into sizes of 1 to 100 microns.

When the coating film is to be formed in the laminate, furthermore, a known coating means is employed such as a roller coating, a spray coating, a dip coating or an electrostatic coating.

In preparing the laminate, no limitation is imposed on the order of working when the means of the present invention and other lamination means or coating means are used in combination. Generally, however, the order of working is suitably determined by taking the easiness of working into consideration. These workings can be continuously carried out.

In preparing the laminate of the present invention, the polyurethane type hot melt is cured with the moisture contained in the open air. Curing with the moisture proceeds sufficiently even at room temperature. The process of the present invention gives such an advantage that peeling or deviation in position does not at all take place before the curing is accomplished since the initial adhesive strength is sufficiently high. The time necessary for the curing differs depending upon whether the laminate is wound into a roll or slit into sheets. The former case needs a longer curing time than the latter case. The curing time at room temperature is of the order of one day to several days. In order to promote the curing, the laminate may be heated at a temperature of 60° C. or lower and, particularly preferably, at 40° C. or lower. In order to further promote the curing, an organotin compound such as a dibutyltin dilaurate or dialkyltin dicarboxylate may be blended in a catalytic amount.

According to the present invention, the laminate after adhered is left to stand in an atmosphere containing humidity or, generally, in the open air, so that the polyurethane is cured with the moisture.

According to the present invention, however, it is allowed to positively feed water into the polyurethane adhesive layer to promote the crosslinking. Water is fed to the adhesive layer by using, for example, a plastic film which contains water in an amount of 20 mg/m$^2$ or more and, particularly, in an amount of 50 mg/m$^2$ or more per a unit area as, at least, one of the flexible blanks that are to be adhered together.

Examples of the plastic film containing the above-mentioned amount of water may be a homopolyamide or a copolyamide having a water content of usually from 0.3 to 5%, an ionomer (ionically crosslinked olefin resin), an ethylene-vinyl alcohol copolymer, a polyvinyl alcohol a polyacrylonitrile, an acrylonitrile styrene copolymer, a cellulose or a derivative thereof, and a variety of plastic films blended with a water-holding agent.

Moreover, water for curing can be supplied to the layer of the adhesive agent by using a plastic film coated with an aqueous ink or an aqueous coating layer containing water in an amount of 5 mg/m² or larger and, particularly, 10 mg/m² or larger per a unit area, on the side of the adhesion surface as one of the flexible blanks that are to be adhered together.

In the flexible packaging, for instance, it is accepted practice to print in advance the back surface of the film that becomes the outer surface of the package in order to make the printing vivid and to enhance the durability. By using an acryl or urethane type composition (see, for example, Japanese Laid-Open Patent Publication No. 295078/1993) as the printing ink or the clear lacquer layer formed thereon, however, it is allowed to hold the water therein so as to use it for curing the adhesive agent.

In the case of a film having a moderate water absorption and a fast speed of water absorption, for example, a biaxially oriented PET film, it is possible to retain water content in the film by blowing steam immediately before coating an adhesive agent, or in a pre-step such as the printing step mentioned above, or after coating the adhesive agent. Since PET itself has high steam permeability, even if water contained in the film does not fulfill the amount required for humidity curing of the adhesive, the imparting of this much water realizes full adhesive performance at the time of using the packaging material.

The laminate according to the present invention can be extensively used for flexible packaging of foods, cosmetic, toiletry and chemicals in the form of laminated films, pouches, cups, heat-sealable closures, etc.

EXAMPLES

The invention will now be described by way of the Examples.

Examples and Comparative Examples

The following adhesive agents were prepared for use in Examples and Comparative Examples.

Adhesive Agent A (Example)

A polyurethane prepolymer having a number average molecular weight of 3100 prepared by mixing and reacting with stirring at 100° C. for four hours 86 parts by weight of a bifunctional polyester polyol having a molecular weight of 2000 obtained by polymerizing adipic acid, isophthalic acid, 1,4-butanediol and ethylene glycol as main components and an isophthalic acid component in an amount of 15 mol % with respect to the whole components, 14 parts by weight of a xylylene diisocyanate, 1 part by weight of a vinyl tris(2-methoxyethoxy) silane and 0.01 part by weight of a dibutyltin dilaurate.

Adhesive Agent B (Example)

A polyurethane prepolymer having a number average molecular weight of 3200 prepared by, first, adding 25 parts by weight of a dicyclohexyl phthalate (plasticizer) to 82 parts by weight of a bifunctional polyester polyol having a molecular weight of 2000 obtained by polymerizing azelaic acid, isophthalic acid, 1,4-butanediol and neopentyl glycol as main components and 20 mol % of isophthalic acid component with respect to the whole components, and then mixing and reacting with stirring the above mixture and 18 parts by weight of a diphenylmethane diisocyanate at 100° C. for four hours.

Adhesive Agent C (Example)

A polyurethane prepolymer having a number average molecular weight of 2800 prepared by, first, adding 20 parts by weight of a glycerol trilaurate (plasticizer) to 81 parts of a bifunctional polyester polyol having a molecular weight of 2000 obtained by polymerizing adipic acid, isophthalic acid, 1,4-butanediol and ethylene glycol as main components and an isophthalic component in an amount of 20 mol % with respect to the whole components, and then mixing and reacting with stirring the above mixture and 19 parts by weight of a diphenylmethane diisocyanate at 100° C. for four hours.

Adhesive Agent D (Example)

A polyurethane prepolymer having a number average molecular weight of 3300 prepared by mixing and reacting with stirring at 100° C. for four hours 84 parts by weight a bifunctional polyester polyol having a molecular weight of 2000 obtained by polymerizing adipic acid, isophthalic acid, sebacic acid and 1,4-butanediol and an isophthalic acid component in an amount of 10 mol % with respect to the whole components, 16 parts by weight of an isophorone diisocyanate and 0.02 parts by weight of a dibutyltin dilaurate.

Adhesive agent E (Comparative Example)

A solventless single-component liquid polyurethane adhesive having a number average molecular weight of 2750 prepared by mixing and reacting with stirring at 70° C. for one hour 100 parts by weight of a bifunctional polyester polyol having a molecular weight of 1000 obtained by polymerizing adipic acid and a propylene glycol as main components, 100 parts by weight of a polyoxyethylene-propylenediol having a molecular weight of 1000, and 75 parts by weight of a diphenylmethane diisocyanate.

Adhesive Agent F (Comparative Example)

An adhesive agent same as the adhesive agent E but having an increased molecular weight and an increased viscosity.

Adhesive Agent G (Comparative Example)

Main agent: A bifunctional polyester polyol having a molecular weight of 5000 obtained by polymerizing adipic acid and a propylene glycol as main components.

Curing agent: Polyisocyanate.

Table 2 shows the added amounts of the plasticizers with respect to the polyurethane in these adhesive agents, amounts of the free isocyanate (—NCO), properties at normal temperature, softening points as measured by the ring and ball testing methods, and viscosities at 120° C. to 20° C. as measured by using the BH-type viscometer.

TABLE 2

| Adhesive agent | Plasticizer (pts by wt) | —NCO (wt %) | Properties | Softening point (°C.) | Viscosity measuring (temp.) (cps)(°C.) |
|---|---|---|---|---|---|
| A | 0 | 2.6 | solid | 50 | 4500 (120) |
| B | 25 | 2.6 | semi-solid | 45 | 4500 (120) |
| C | 10 | 2.7 | semi-solid | 40 | 3500 (120) |
| D | 0 | 2.5 | semi-solid | 35 | 2000 (120) |

TABLE 2-continued

| Adhesive agent | Plasticizer (pts by wt) | —NCO (wt %) | Properties | Softening point (°C.) | Viscosity measuring (temp.) (cps)(°C.) |
| --- | --- | --- | --- | --- | --- |
| E | 0 | 3.1 | liquid | — | 100000 (25) |
| F | 0 | 2.1 | liquid | — | 350000 (25) |
| G | | | | | |
| main agent | 0 | — | liquid | — | 350000 (25) |
| curing agent | 0 | 31 | liquid | — | 2000 (25) |

The following substrates were prepared for being laminated.

Substrate I: A biaxially oriented polyethylene terephthalic film which is printed and having a thickness of 12 μm.

Substrate II: A biaxially oriented nylon film of which both surfaces are subjected to the corona discharge treatment.

Substrate III: A cast polypropylene film having a thickness of 70 μm of which the surface to be laminated is subjected to the corona discharge treatment.

Substrate IV: A substrate obtained by laminating the substrate I and a soft aluminum foil having a thickness of 7 μm by using a solvent type urethane adhesive agent for the purpose of measuring the adhesive strength.

By using a solventless laminator, the adhesive agent was applied onto the substrate I which was then laminated on the substrate II and was wound on a roll. The working rate was 150 m/min., and the adhesive agents A, B, C, D and F were applied at a temperature of 120° C., the adhesive agents E and G were applied at 90° C., and the substrate I and the substrate II were press-adhered together at a temperature of 80° C. As for the adhesive agent G, the main agent and the curing agent were mixed at a ratio of 4:1 and were fed just before the lamination.

The results of testing indicated that the adhesive agents A, B, C and D could be applied in amounts of 2 to 6 g/m² owing to the revolving ratio of the rolls. The applied surfaces were relatively smooth, but foams remained to some extent when the adhesive agent A was used. The foams, however, extinguished about one hour after the lamination (Example).

With the adhesive agents E and G, on the other hand, the amounts of application were as small as 1 to 2 g/m² or smaller and could not be increased despite the revolving ratio of the rolls was changed. With the adhesive agent F, on the other hand, the amount of application was too great, threading took place to a considerable degree at the time of application and the adhesive agent was suspended in the form of mist. Moreover, the applied surface was so coarse that foam remained in large amounts and did not completely extinguish even after a whole day has passed.

By using the adhesive agents A, B, C, D, E and G but F, the substrate I was laminated on the substrate II, and then the substrate III was continuously laminated on the applied surface of the substrate II. The laminate was then wound on a roll.

The results of testing indicated that there was no particular problem when the adhesive agents A, B, C and D were used (Examples), but when the adhesive agents E and G were used, tunneling developed between the substrate I and the substrate II when the laminate was unwound from the roll, and the lamination working could not be continuously carried out (Comparative Examples).

The laminates obtained by using the adhesive agents A, B, C and D that did not develop tunneling could be continuously subjected to the slit working and bag-forming working (Examples).

In the Examples, the laminate could be continuously worked without developing tunneling presumably owing to the cohesive force of the reactive hot-melt adhesive agent which is in a solid or semi-solid form at normal temperature. The table testing was carried out in order to make sure this point.

The adhesive agents A, B, C and E were applied onto the substrate IV on the side of the aluminum foil, and the substrate III was laminated thereon. In order that the adhesive agents were applied in the same amount, i.e., 4±1 g/m² and that the stress that is a cause of tunneling was minimized between the substrates, there was used a test coater consisting of two heated rolls to apply the adhesive agents, and the press-adhesion to the opposing substrate was manually carried out by using a roll heated at 70° C. and a rubber roll. The adhesive strength between the aluminum-foil and the substrate III was measured immediately after the lamination, after seven days have passed maintaining room temperature, and after the retort treatment at 125° C. for 30 minutes conducted after seven days have passed maintaining room temperature. The peeling strength (T-peeling) was measured by using a tensile tester at crosshead moving speeds of 30 and 300 mm/min. The measured results were as shown in Table 3.

TABLE 3

| | Immediately after | | 7 Days after | | After retorting and 7 days | |
| --- | --- | --- | --- | --- | --- | --- |
| Peeling rate (m/min) | 30 | 300 | 30 | 300 | 30 | 300 |
| Adhesive A | 60 | 500 | 850 | 980 | 880 | 960 |
| Adhesive B | 70 | 450 | 780 | 950 | 800 | 950 |
| Adhesive C | 50 | 270 | 670 | 750 | 720 | 800 |
| Adhesive E | 1 or less | 30 | 370 | 400 | 0 | 0 |

* unit is in g/15 mm of width.

Immediately after the lamination, the adhesive strength greatly varied depending upon the peeling rate irrespective of the kinds of the adhesive agents probably due to the fact that the adhesive agent had not been cured. When the absolute strengths are compared, however, the adhesive agents A, B and C (Examples) exhibit large values compared with the values of when the adhesive agent E (Comparative Example) is used. Moreover, the adhesive agents B and C to which the plasticizer was added exhibited sufficiently great adhesive strengths (Embodiments).

In the case of the Examples using the reactive hot-melt adhesive agent as indicated by the result of using the solventless type laminator, the tunneling does not develop even immediately after the lamination probably because the adhesive agent behaves as a solid material enabling the adhesive strength to be maintained even at a very slow peeling rate. When the conventional solventless type adhesive agents that are in a liquid form at normal temperature are used as in Comparative Example, the adhesive strengths are low though they can be measured at a rapid peeling rate but cannot be almost measured at a slow peeling rate.

After seven days have passed by which curing has so advanced that the peeling strength is little dependent upon the peeling rate, comparison of the adhesive strengths after retorting indicates that the adhesive agents A, B and C (Examples) make it possible to maintain sufficient adhesive strength even after retorting but the adhesive agent E (Comparative Example) permits the adhered portion to be peeled simply through the retort-processing. As described above, Examples offer high adhesive strength even for the aluminum foil to which adhesion can be accomplished difficultly due to deterioration by hot water.

Furthermore, a pouch having an inner surface area of about 350 cm² was prepared by using a laminate prepared using the adhesive agent A, filled with 200 g of distilled water and was sealed and subjected to the retort-processing at 121° C. for 120 minutes to carry out the extraction testing. As a result, the amount of diamine extracted from the starting diisocyanate was as very small as 160 ppb which was of the same level as that of the solvent type urethane adhesive agent for retorting (Example).

Next, the dependency of the adhesive strength upon the temperature was evaluated concerning the adhesive agent A, adhesive agent B, solventless type two-component adhesive agent (adhesive agent H) for retorting and solvent type two-component adhesive agent (adhesive agent I) for retorting.

As the solventless type adhesive agent (adhesive agent H), there was prepared a polyurethane adhesive agent comprising, as a main agent, a polyester that contains, as an acid component, an aromatic carboxylic acid such as isophthalic acid or a terephthalic acid and, as a curing agent, a polyisocyanate which is a xylylene diisocyanate. The main agent exhibited a viscosity of 340000 cps at room temperature and the curing agent exhibited a viscosity of 2200 cps. These agents are used being mixed at a ratio of 5 to 2.

As the solvent type adhesive agent (adhesive agent I), there was prepared a polyester epoxy polyurethane adhesive agent comprising, as a main agent, a polyester resin of a polybasic acid modified with an epoxy resin and a polyhydric alcohol and, as a curing agent, a trimer of isophorone diisocyanate. The solvent for the main agent was methyl ethyl ketone having a solid content of 40% by weight, and the solvent for the curing agent was ethyl acetate having a solid content of 70%. They were mixed at a ratio of 20 to 1, followed by dilution with toluene so that the solid content was 25%.

The samples measured were those obtained by laminating the substrate II and the substrate III, and by laminating the substrate IV and the substrate III using the adhesive agents. The adhesive agent was applied in an amount of 3±1 g/m² and the curing was effected by cutting the laminate into sheets. The laminates using the adhesive agents A and B were placed in an air-conditioned room maintained at 25° C. and a relative humidity of 50% for five days, the laminate using the adhesive agent H was placed therein maintained at 40° C. for four days, and laminate using the adhesive agent I was placed therein maintained at 50° C. for six days. The peeling strengths between nylon and propylene and between aluminum foil and polypropylene of the thus obtained laminates were evaluated at 25° C., 80° C. and 120° C. The measurement was taken by using the tensile tester while moving the crosshead at a speed of 300 mm/min. The measured results and the peeling appearance were as shown in Tables 4 and 5.

TABLE 4

Adhesive strength between the substrate II (nylon) and the substrate III (polypropylene).

| Substrate II/ substrate III | 25° C. | 80° C. | 120° C. |
| --- | --- | --- | --- |
| Adhesive A | 690 | 720 | 510 |
| | (100%) interface destruction | (104%) cohesive destruction | (74%) cohesive destruction |
| Adhesive B (plasticizer added) | 770 (100%) interface destruction | 740 (96%) cohesive destruction | 480 (62%) cohesive destruction |
| Adhesive H (solventless two-component type) | 600 (100%) interface destruction | 170 (28%) interface destruction | 40 (7%) interface destruction |
| Adhesive I (solvent type) | 530 (100%) interface destruction | 450 (85%) interface destruction | not peeled cohesive destruction |

\* unit in g/15 mm of width.
\*\* cohesive destruction; peeled due to cohesive destruction of the adhesive agent.
\*\*\* interface destruction; peeled due to interface peeling between nylon and adhesive agent.

TABLE 5

Adhesive strength between the substrate IV (PET.Al foil) and the substrate III (polypropylene).

| Substrate IV/ substrate III | 25° C. | 80° C. | 120° C. |
| --- | --- | --- | --- |
| Adhesive A | 980 (100%) interface destruction | 590 (60%) cohesive destruction | 350 (36%) cohesive destruction |
| Adhesive B (plasticizer added) | 740 (100%) interface destruction | 620 (84%) cohesive destruction | 420 (57%) cohesive destruction |
| Adhesive H (solventless two-component type) | 530 (100%) interface destruction | 90 (17%) interface destruction | 30 (6%) interface destruction |
| Adhesive I (solvent type) | 870 (100%) interface destruction | 490 (56%) cohesive destruction | 290 (33%) cohesive destruction |

\* unit in g/15 mm of width.
\*\* cohesive destruction; peeled due to cohesive destruction of the adhesive agent.
\*\*\* interface destruction; peeled due to interface peeling between aluminum foil and adhesive agent.

With the laminates using the adhesive agents A and B as shown in Table 4, the peeling strength decreased little even at 80° C. and 120° C. and was nearly of the same level as that of the solvent type adhesive agent I. As shown in Table 5, furthermore, high performance was similarly exhibited even for the aluminum foil to which adhesion can be accomplished relatively difficultly (Example). The laminate using the solventless type adhesive agent H exhibited a value at 25° C. that was of the same level as, or slightly lower than, those of other laminates, but exhibited very large temperature dependency or inferior adhesion property at high temperatures, such as 20 to less than 30% of the adhesive strength at 25° C. when heated at 80° C. and smaller than 10% of the adhesive strength when heated at 20° C. (Comparative Example).

In the laminates using the adhesive agents A and B (Examples) and the solvent type adhesive agent I, the peeling at a temperature of 25° C. took place on the interface between the substrate and the adhesive agent. When heated at 80° C. and 120° C., however, the peeling was almost all due to cohesive destruction of the adhesive agents, and the surfaces of peeling had been whitened. In the laminate using the solvent type adhesive agent H (Comparative Example), on the other hand, the peeling was due to interface destruction between the substrate and the adhesive agent under every condition. At a temperature of 25° C., the peeled surface of the adhesive agent had been slightly whitened. At temperatures of 80° C. and 120° C., however, the surface was not whitened but was like a mirror surface.

It is presumed from the above that the laminates using the adhesive agents A and B (Examples) and the solvent type adhesive agent I exhibit high adhesive property at high temperatures since the energy of destruction is absorbed by the relaxation of stress inside the adhesive agent and the stress of destruction is dispersed by the plastic deformation of the adhesive agent. In order to make sure this point, the adhesive agents were measured for their dynamic viscoelasticity after cured.

Sheets using the adhesive agents were prepared as samples for measurement. The sheets using the adhesive agents A and B were cured in an air-conditioned room maintained at 25° C. and a relative humidity of 50% for one week, the sheet using the adhesive agent I was cured at 40° C. for four days, and the sheet using the adhesive agent H was cured at 50° C. for six days. The adhesive agents A and B of the type of curing with the moisture were cured requiring an extended period of time since the samples were thick. It was, however, confirmed through the infrared spectroscopy that the reaction had been finished in these samples and there remained no free isocyanate group. Short strips having a length of about 40 mm and a width of 2 to 4 mm were cut out from the obtained sheets having thicknesses of 0.3 to 0.8 mm, and were measured for their dynamic viscoelasticities under the below-mentioned conditions. FIG. 3 shows the measured results of the adhesive agent A, adhesive agent H and adhesive agent I.

Device: REOVIBRON DDV-II-EA manufactured by Orientec Co.

Effective length of sample: 30 mm

Rate of temperature rise: 1° C.

Data interval: 1° C.

Frequency: 110 Hz

Measuring displacement: $\pm 160 \times 10^{-3}$ mm

When the solvent type adhesive agent I that can be adapted to all applications is compared with the conventional solventless type adhesive agent H that is adapted to such applications as packaging snacks, etc. but that fails to give satisfactory results for such applications as retort packagings, the former adhesive exhibits tan δ of a large value over a relatively broad range from ten and several degrees up to a high temperature. This fact means that this adhesive agent has a relaxation mode over a wide range of temperatures. In the case of the latter adhesive agent, on the other hand, the peak profile is sharp and suddenly drops as the temperature rises. This fact means that this adhesive agent has very little relaxation mode at high temperatures and exhibits elastic behavior. The adhesive agent A exhibits tan δ of a large value even at high temperatures though the value is not as great as that of the solvent type adhesive agent, from which it will be understood that the adhesive agent A has the relaxation mode at high temperatures.

The relaxation R at high temperatures is defined by the following equation, and the values of the adhesive agents are shown in Table 6.

where (tan δ) is a peak value of tan δ, and $(\tan \delta)_{120}$ is a value of tan δ at 120° C.

The adhesive agents exhibiting excellent adhesive properties at high temperatures have high values R.

TABLE 6

|  | Peak temp. | $(\tan \delta)_p$ | $(\tan \delta)_{120}$ | R |
| --- | --- | --- | --- | --- |
| Adhesive A | 33° C. | 1.70 | 0.29 | 17% |
| Adhesive B | 11° C. | 1.19 | 0.27 | 23% |
| Adhesive C | 26° C. | 1.85 | 0.37 | 20% |
| Adhesive H | 24° C. | 2.05 | 0.06 | 3% |
| Adhesive I | 35° C. | 0.88 | 0.43 | 49% |

In the case of the adhesive agent B, the peak temperature of tan δ drops when the plasticizer is added (see FIG. 4). That is, the temperature at which the adhesive agent becomes brittle drops, from which it is expected that the impact resistance at low-temperatures is improved. In order to make sure this, pouches of a size of 160 mm×120 mm were prepared using the substrates II and III, filled with 180 ml of water, sealed, and were then permitted to fall on the concrete surface from a height of 80 cm in an atmosphere of 5° C. As a result, the pouches using the adhesive agent B containing the plasticizer did not break but the pouches using the adhesive agent A without containing the plasticizer were broken near the heat-sealed portions in a number of two pouches among 100 pouches. The plasticizer improves applicability and impact resistance at low temperatures (Example).

Next, the substrates IV and III were laminated together using the adhesive agent A and the solvent type adhesive agent I, and the amounts of the solvent remaining in the laminate were evaluated as described below. After laminated, the curing was carried out in a state in which the laminate was wound on a roll.

A sealed pouch with its periphery being heat-sealed was prepared using two pieces of samples of a size of 160 mm×120 mm. An injection needle was pierced into a corner of the pouch which was then filled with 70 ml of a nitrogen gas while holding it with fingers so that the air was not introduced therein. Then, the pierced portion was quickly closed by the heat-sealing. The pouch was left to stand in an air-conditioned room maintained at 120° C. for 20 minutes and was then left to cool at room temperature for 10 minutes. One milliliter of the gas in the container was picked up using a gas-tight syringe, and the concentration of the solvent was measured by the gas chromatography. The residual amount Q (mg/m²) of the solvent was found in compliance with the following equation, $$Q = C \cdot V/S$$

where C is a concentration of the solvent (mg/ml) as measured by the gas chromatography, V is the total amount of gas (ml) in the pouch, and S is the inner surface area (m²) of the pouch.

Details of the measuring conditions were as described below.

Device: Gas chromatography GC-9A produced by Shimazu Mfg. Co.

Detector: FID

Column: made of a glass (3 m in length, 3 mm in internal diameter)

Filler: Liquid phase—polyethylene glycol Carrier—diatomaceous earth-type carrier treated with acid and silane Carrier gas: nitrogen gas Column temperature: 80° C.

Detector temperature: 150° C.

Temperature of the sample injection port: 150° C.

In the case of the pouch using the adhesive agent I of the solvent type, methyl ethyl ketone contained in the main agent, ethyl acetate contained in the curing agent and toluene used as a diluting solvent were detected in amounts of 2.2 μg/m², 0.4 μg/m² and 79.9 μg/m², respectively, and in a total amount of 82.5 μg/m² (Comparative Example). In the case of the pouch using the adhesive agent A, on the other hand, toluene was detected in an amount as small as 0.2 μg/m² but other components were not detected (Example). The toluene detected stemmed from the printing ink or the adhesive agent applied to the outer surface side and is estimated to have migrated when the laminate was wound on a roll. Next, the adhesive agent A was examined for its curing property by using the following substrates.

Substrate A: A biaxially oriented polyethylene terephthalate film having a thickness of 12 μm with its one surface being subjected to the corona discharge treatment.

Substrate B: A biaxially oriented polyethylene terephthalate film having a thickness of 12 μm printed on the corona discharge treatment surface thereof with a solvent-type ink.

Substrate C: A biaxially oriented polyethylene terephthalate film having a thickness of 12 μm printed on the corona discharge treated surface thereof with an aqueous ink of the acrylic urethane type.

Substrate D: A biaxially oriented nylon film having a thickness of 15 μm of which both surfaces being subjected to the corona discharge treatment.

Substrate E: A laminate obtained by sandwich-laminating an aluminum foil which is 7 μm thick and an cast polypropylene film which is 60 μm thick using a polypropylene resin modified with a maleic anhydride, followed by the heat-treatment at 200° C.

The amounts of water contained in the substrates were measured in accordance with Karl Fischer's method by using a micro-water content measuring device MKC-210 (micro-titration system) and a water vaporization device ADP-351 manufactured by Kyoto Denshi Kogyo Co. The temperature of the water vaporizing device was set at 150° C. and the flow rate of the carrier gas (nitrogen gas) was 200 ml/min. The results of measurement were as shown in Table 7.

TABLE 7

|  | Amount of water (mg/m²) |
| --- | --- |
| Substrate A | 17 |
| Substrate B | 16 |
| Substrate C | 40 |
| Substrate D | 258 |
| Substrate E | 0 |

The amount of water in the substrate C is larger than that of the substrate B probably because water is contained in the aqueous ink, and the amount of water in the aqueous ink is calculated to be 23 to 24 mg/m².

Next, the substrates A, B, C and D were laminated on the substrate E, which was then wound on a roll. The application of the adhesive agent and the lamination were carried out by the top feed reverse system using a multi-purpose coating machine manufactured by Hirano Tecseed Co., Ltd. The application temperature was 120° C., the application rate was 1 m/min., and the application amount was 4 g/m². The rolls were preserved in an air-conditioned room maintained at 25° C. and a relative humidity of 50%. Each laminate was unwound by 5 m after every day in order to examine the adhesion condition among the substrates at the central portion.

In a combination of the substrate D and the substrate E and in a combination of the substrate C and the substrate E, the laminates could not be peeled on the second day and third day. In a combination of the substrate A and the substrate E and in a combination of the substrate B and the substrate E, however, the laminates could be peeled up to the fifth day but could not be peeled on the sixth day. The above-mentioned results are obtained probably because with the laminate being wound on the roll and, particularly, in the central portion, the supply of water from the open air is limited, and water contained in the substrates dominates the curing rate.

When the amount of applying the adhesive agent is 4 g/m², water is required in an amount of about 22 mg/m² by the content of the isocyanate groups if it is presumed that the curing is all accomplished with the moisture. That is, the time for the curing reaction can be efficiently shortened even under the condition where the laminate is wound on the roll by utilizing the substrate which contains large amounts of water in combination with feeding water from the open air.

Moreover, a cast $TiO_2$ containing polypropylene film having a thickness of 70 μm was laminated by using the adhesive agent A on both surfaces of a chromate-treated 75 μm-thick steel foil. By using a die of a metal and a punch of a polyurethane, the laminate could be formed into a cup-like container having a diameter of 65 mm and a depth of 30 mm. The cup-like container did not develop such defects as delamination and the like even when it was subjected to the retort processing.

We claim:

1. A laminate for flexible packaging comprising a plurality of flexible blanks and an intervening adhesive layer, wherein said adhesive layer is formed by crosslinking an isocyanate-terminated polyurethane hot-melt in a solid or semi-solid form at normal temperature with moisture, wherein said isocyanate-terminated polyurethane is obtained from a polyester polyol component which contains 3 to 50 mol % of an aromatic component selected from the group consisting of an aromatic diol and an aromatic dicarboxylic acid.

2. A laminate for flexible packaging comprising a plurality of flexible blanks and an intervening adhesive layer, wherein said adhesive layer is formed by crosslinking an isocyanate-terminated polyurethane hot-melt in a solid or semi-solid form at normal temperature with moisture, wherein said isocyanate-terminated polyurethane has a number average molecular weight of 1000 to 10000 and contains free isocyanate groups in an amount of 0.84 to 8.4 weight percent, and is derived from polyester polyol components having a number average molecular weight of 300 to 5000, wherein said isocyanate-terminated polyurethane is obtained from a polyester polyol component which contains 3 to 50 mol % of an aromatic component selected from the group consisting of an aromatic diol and an aromatic dicarboxylic acid.

3. A laminate for flexible packaging comprising a plurality of flexible blanks and an intervening adhesive layer
wherein said adhesive layer is formed by crosslinking an isocyanate-terminated polyurethane hot-melt resin in a solid or semi-solid form at normal temperature with moisture,
wherein said laminate has a residual amount of an organic solvent of 10 μg/m² or smaller per m² of surface area,
wherein said laminate has a peeling strength at 25° C. of 250 g/15 mm of width or greater,
and wherein said laminate has a peeling strength retention at 80° C. of 30% or greater than the peeling strength at 25° C.,
wherein said isocyanate-terminated polyurethane is obtained from a polyester polyol component which contains 3 to 50 mol % of an aromatic component selected from the group consisting of an aromatic diol and an aromatic dicarboxylic acid.

4. A laminate for flexible packaging according to claim 1, 2 or 3, wherein the adhesive layer has a dynamic viscoelastic property such that a temperature p at a peak value of tan δ is 55° C. or lower where tan δ is defined by the equation $$\tan \delta = \frac{E"}{E'} \quad (1)$$

where E' is the storage modulus of elasticity in the measurement of dynamic viscosity, and E" is the loss modulus of elasticity, and that a high-temperature relaxation property is 8% or greater where said high-temperature relaxation property is defined by the equation, $$R = \frac{(\tan \delta)_{120}}{(\tan \delta)_p} \times 100 \quad (2)$$

where $(\tan \delta)_p$ is the peak value of tan δ at said temperature p, and $(\tan \delta)_{120}$ is the value of tan δ at 120° C.

5. A laminate according to claim 1, 2, or 3, wherein the adhesive layer contains a plasticizer in an amount of 1 to 70 parts by weight per 100 parts by weight of the isocyanate-terminated polyurethane.

6. A laminate according to claim 5, wherein said plasticizer is in a solid or semi-solid form at normal temperature.

7. A laminate according to claim 5, wherein said plasticizer is selected from the group consisting of a diphenyl phthalate, a dicyclohexyl phthalate, a dimethylcyclohexyl phthalate, an ethylphthalate ethyl glycolate, a triphenylphosphate, a diethylenegylcol dibenzoate, a trimethoxy propane, a glycerol tribenzoate, and a glycerol trilaurate, which is in a solid or semi-solid form at normal temperature.

8. A laminate according to claim 1, 2, or 3, wherein the polyurethane hot-melt resin layer comprises an isocyanate-terminated polyurethane having a number average molecular weight of 1000 to 10000 and a viscosity at 120° C. of from 500 to 40000 cps as measured by using a BH-type viscometer.

9. A laminate according to claim 1 or 3, wherein the isocyanate-terminated polyurethane has a softening point of 30° C. or higher as measured by the ring and ball testing method.

10. A laminate according to claim 1, 2, or 3, wherein the isocyanate-terminated polyurethane contains a polyester polyol component having a number average molecular weight of 300 to 8000 and contains free isocyanate groups in an amount of from 0.84 to 8.4% by weight.

11. A laminate according to claim 1, 2, or 3, wherein at least one of the flexible blanks comprises of a metal foil.

12. A laminate according to claim 1, 2, or 3, wherein said adhesive layer contains a silane coupling agent in an amount of up to 10 parts by weight per 100 parts by weight of the isocyanate-terminated polyurethane.

* * * * *